United States Patent [19]
Jones

[11] 3,741,493
[45] June 26, 1973

[54] FISHING REEL

[76] Inventor: Cyril W. Jones, 3100 Warm Springs Avenue, Boise, Idaho 83702

[22] Filed: May 13, 1971

[21] Appl. No.: 142,987

[52] U.S. Cl. ..................... 242/84.1 R, 242/84.51 R
[51] Int. Cl. ............................................ A01k 89/02
[58] Field of Search ............... 242/84.51 R, 84.5 R, 242/218, 219, 220, 84.1 R, 214

[56] References Cited
UNITED STATES PATENTS

| | | | |
|---|---|---|---|
| 1,871,386 | 8/1932 | Pflueger | 242/84.51 R |
| 2,417,732 | 3/1947 | Bland et al. | 242/84.51 R |
| 2,489,457 | 11/1949 | Maerk | 242/218 |
| 757,964 | 4/1904 | Rockwell | 242/84.51 R |

Primary Examiner—Billy S. Taylor
Attorney—John W. Kraft

[57] ABSTRACT

The fishing reel of the invention includes a line crank winding assembly having a ratchet about the outermost periphery of the assembly. The line winding assembly is journaled for rotation on an axle suitably mounted in a reel housing and the ratchet portion of the winding assembly is engageable with a a spring loaded pawl pivotally mounted in the housing. Drag tension on the winding assembly may be selectively adjusted in response to movement of an eccentric disc provided to urge a spring against the pawl. The winding assembly is engaged and disengaged from the axle in the housing in response to movement of an eccentric locking means on the axle engaging the terminal edge of a bushing provided in the innermost portion of the line core hub of the winding assembly.

5 Claims, 9 Drawing Figures

CYRIL W. JONES
INVENTOR

FISHING REEL

FIELD OF INVENTION

This invention relates to fishing reels and more particularly to fishing reels commonly referred to as casting and fly type reels.

BRIEF DESCRIPTION OF THE PRIOR ART

Casting and fly type reels known in the prior art use and employ gear-like ratchet control means suitably fastened to the hub, axle or core of the reel operating mechanism. Since such means are of small diameters, substantially strong material must be used to fabricate such parts and a degree of manual strength and agility is required in their use. Usually such structures are complex and are difficult to maintain except by those especially skilled in the art of manufacturing and assembling fishing reels.

Accordingly, it is an extremely important object of this invention to provide a fishing reel having few operating parts which may easily and readily be assembled and disassembled for maintenance and cleaning by novices to the art.

Another object of this invention is to provide in a fishing reel means operable to advantageously optimally use and employ maximum mechanical advantage to tend to reduce the manual strength and agility required in operation.

These and other objects shall become apparent from the description following, it being understood that modifications may be made without affecting the teachings of the invention here set out.

Generally, the fishing reel of the invention includes a line crank winding assembly having a ratchet about the outermost periphery of the assembly. The line winding assembly is journaled for rotation on an axle suitably mounted in a reel housing and the ratchet portion of the winding assembly is engageable with a spring loaded pawl pivotally mounted in the housing. Drag tension on the winding assembly may be selectively adjusted in response to movement of an eccentric disc provided to urge a spring against the pawl. The winding assembly is engaged and disengaged from the axle in the housing in response to movement of an eccentric locking means on the axle engaging the terminal edge of a bushing provided in the innermost portion of the line core hub of the winding assembly.

A more thorough and comprehensive understanding may be had from the detailed description of the preferred embodiment when read in connection with the drawings forming a part of this specification.

DESCRIPTION OF THE PREFERRED EMBODIMENT

Figure 1:
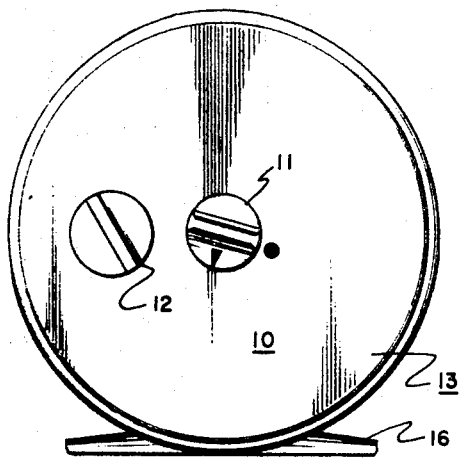
FIG. 1 is a side elevational view of the fishing reel of present invention showing to advantage the reel assembly locking control knob and the line brake-drag control knob.
Figure 2:
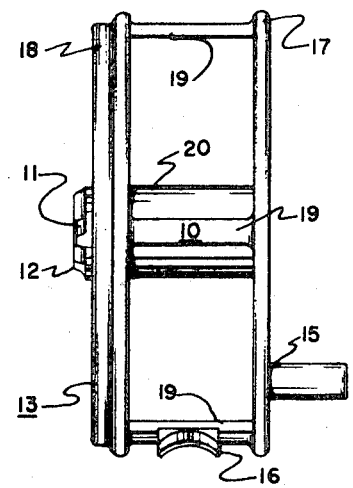
FIG. 2 is an end elevational view of the reel of this invention advantageously showing respective control members and crank winding assembly.
Figure 3:
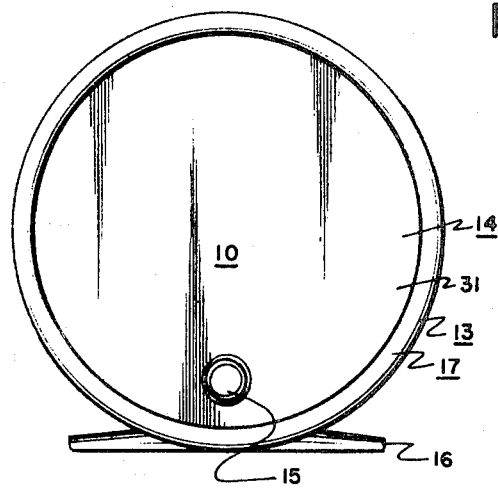
FIG. 3 is a side elevational view of the side opposite the FIG. 1 showing the crank winding assembly.

Referring now to the drawings and more particularly to the FIGS. 1, 2, and 3, the fishing reel of the present invention is shown to advantage and identified generally by the numeral 10. The reel includes a reel assembly locking control knob 11, a line brake-drag control knob 12, an operating housing 13, a line crank winding assembly 14 having a handle 15 and a pole mounting base 16. The operating housing 13 is provided with an annular line crank mounting frame 17 distally disposed from a housing body portion 18. Although the frame 17 is here shown carried by a multiplicity of outwardly projecting support arms 19 disposed between the body portion 18 and the annular frame 17, it is to be understood that the body 18 and the frame 17 may comprise an integral housing having an exitway or opening through which a fishing line may pass from the crank winding assembly 14. The crank winding assembly 14 is journaled for rotation in the frame 17. The crank winding assembly 14 is provided with a reel core portion 20 which is journaled for rotation on an axle and assembly locking means 21 carried by the body 18 of the housing assembly 13 as hereinafter later described.

Figure 4:
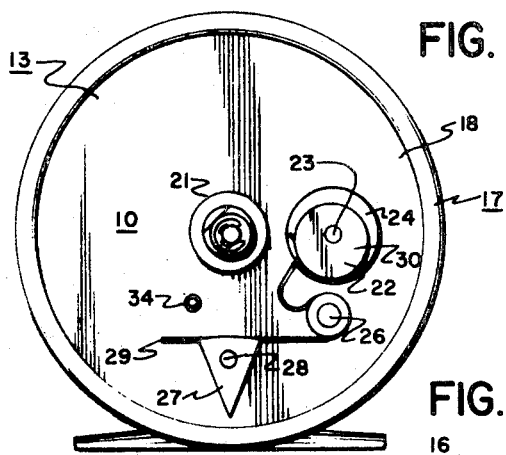
FIG. 4 is a side elevational view of the reel housing assembly as shown from the same side as the FIG. 3 having the crank winding assembly removed.
Figure 5:
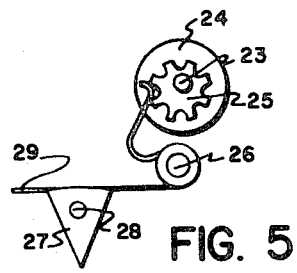
FIG. 5 is a side elevational view of the line brake-drag assembly with the control knob and retainer means removed to show to advantage the spider eccentric brake-drag control assembly.

Referring now to the FIG. 4, the operating assembly in the housing is shown to advantage. The reel axle and assembly locking means 21 is centrally disposed in the body 18 and projects outwardly therefrom. In order to avoid descriptive redundancy the body 18 is hereinafter later more fully described. A line brake-drag assembly 22 is distally mounted in the body 18 of the housing 13. The line brake-drag assembly 22 includes the control knob 12 shown in the FIGS. 1 and 2. The knob 12 is provided with a pin 23 journaled for rotation in the body 18 of the housing 13. The knob 12 and the pin 23 are suitably retained in the body 18 such as by a commonly known locking washer shown at 24. An eccentrically shaped substantially round spider-like disc 25, shown to advantage in FIG. 5, is suitably fastened distally from the terminal end of the pin 23 opposite the knob 12. An outwardly retaining pin 26 is suitably fastened to the body 18 below the pin 23 carrying the eccentric disc 25. A substantially triangular shaped pawl 27 is pivotally carried on a pin 28 mounted to the body 18 of the housing 13. A substantially S-shaped spring 29 is carried in a groove (not shown) in the base of the triangular pawl 27 and about the retaining pin 26 to engage the spider-like portions of the disc 25. As the knob 12 and the disc 25 carried by the pin 23 are rotated, the eccentric disc 25 tends to urge a greater or lesser force upon the spring 29 depending on the preselected position of the eccentric disc 25 which is transmitted by the spring 29 to the pawl 27. A lock washer 30 is fastened on the terminal end of the pin 23 to tend to retain the spring 29 on the eccentric disc 25 and between the washers 24 and 30. The pawl 27 engages a ratchet 31 of the line crank assembly as hereinafter set out.

Figure 6:
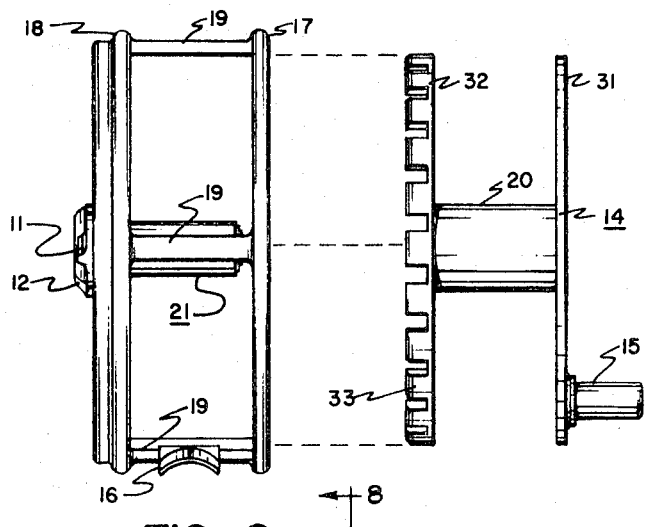
FIG. 6 is an exploded end elevational view of the reel housing assembly and the crank winding assembly.
Figure 7:
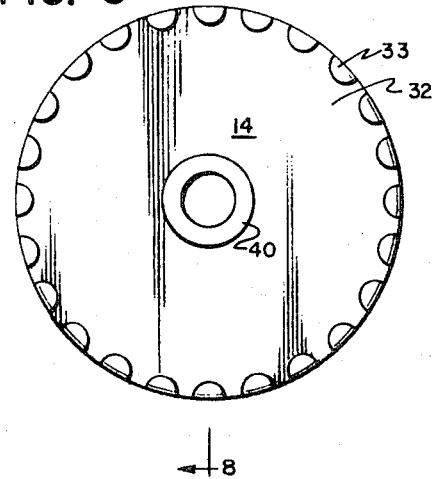
FIG. 7 is a side elevational view of the crank winding assembly as viewed from the side opposite the FIG. 3 showing to advantage the ratchet portion of the crank winding assembly.
Figure 8:
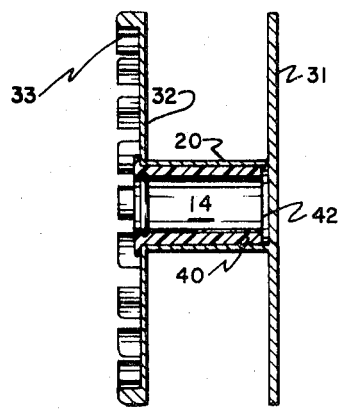
FIG. 8 is a cross sectional elevational view of the crank winding assembly taken substantially along the lines 8—8 of the FIG. 7.

Referring now to the FIGS. 6, 7, and 8, the line crank assembly 14 is shown to advantage. The line crank assembly 14 comprises a tubular reel core portion 20 carried between a pair of opposing upstanding walls 31 and 32. A handle 15 is suitably fastened to the wall 31 and is operable to manually rotate the assembly 14. The core 20 is adapted to receive a fish line (not shown) which may be wound thereon in response to rotation of the assembly 14. The opposite wall 32 is provided with a multiplicity of outwardly projecting tooth like portions 33 forming a ratchet about the periphery thereof. The pawl 27 is engaged between the portions 33 and is pivotally moved in response to rotation of the assembly 14. A greater or lesser force is selectively urged by the pawl 27 on the assembly 14 in response to pressure urged against the spring 29 by reason of the positioning of the spring 29 on the accentric disc 25. It has been found in practice that a lesser pressure on a ratchet about a periphery of a larger diameter is required than for an internal gear ratchet of a smaller diameter. That is to say that it appears that the force on the ratchet is directly proportional to the diameter squared or $F=D^2$.

Referring again to the FIG. 4, an anti-reverse stop pin such as shown at 34 may be suitably fastened to the body 18 distally above the terminal end of spring 29 adjacent the pawl 27. In this manner the spring 29 will engage the pin 34 and prevent pivotal movement of the pawl 28 in that direction. Hence, the ratchet portions 33 may not be moved in that direction over the pawl 27.

Figure 9:
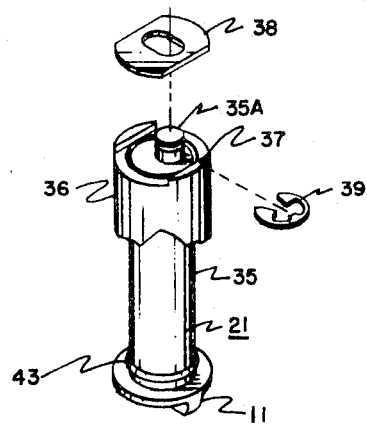
FIG. 9 is an exploded view of the reel axle and assembly locking means.

The FIG. 9 advantageously shows the axle and assembly locking means 21. The means 21 include the knob 11 at one of the terminal ends of an axle shaft 35. The shaft 35 includes an upstanding pin 35A at the terminal end opposite the knob 11. The pin 35A is distally disposed from the center of the shaft 35. A substantially frictionless tubular sleeve 36 is suitably fastened to the axle shaft 35. A pair of upstanding projections 37 are provided at the terminal end opposite the knob 11. A substantially round washer 38 having a pair of opposing straight sides is adapted to be carried between the projections 37. The washer 38 may be suitably fastened to the shaft 35 such as by lock washers 39. When the knob 11 is rotated, the pin 35A, carried by the shaft 35, tends to move and project the washer 38 outwardly beyond the periphery of the sleeve 36. Referring again to the FIGS. 7 and 8, the core 20 is provided with a bushing 40. The bushing 40 is of a lesser length than the core 20 leaving a recess or space 41 between the terminal end of the bushing 40 and the wall 31 of the crank winding assembly 14 as more clearly shown in the cross sectional elevational view of the FIG. 8. When the axle and assembly locking means 21 is inserted into the bushing 40 of the crank winding assembly 14, the assembly 14 may be latched or unlatched from the housing by moving the washer 38 into and out of the recess 41 in response to rotational movement of the knob 11 and the shaft 35 by the eccentric movement of the pin 35A urging the washer 38 into and out of the recess 41. Indicia may be placed on the outermost wall of the body 18 and on the knob 11 substantially as shown in FIG. 1 to indicate open and locked positions of the assembly 10.

It will be noted that an O-ring 42 is shown adjacent the knob 11 on the shaft 35. It is to be understood that means such as the O-ring 42, and an O-ring in body 18 adjacent the wall 31 of the crank winding assembly 14 may be desirable to sealingly keep water, sand, or other contaminants from the operating assemblies of the invention.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A fishing real comprising a reel assembly and a reel housing, said reel assembly having a pair of opposing upstanding side walls being spaced apart by a tubular hub disposed between said walls, a crank handle mounted on one of said side walls and being distally disposed near the terminal edge on the outermost side thereof with respect to said hub on said side wall, the opposite said side wall including a multiplicity of toothlike portions projecting outwardly from said wall on the side opposite said tubular hub, said portions being annularly spaced apart at intervals adjacent the terminal edge of said wall and forming a ratchet portion on said wall, a bushing carried in said tubular hub of said reel, said bushing being shorter than said hub and being operable to form a recess portion in said hub adjacent the terminal end of said bushing, said housing comprising an upstanding housing body and an annular frame being spaced apart by a multiplicity of supports, each of said supports including an exitway through which a fishing line carried by said reel may pass, an axle portion in said housing body projecting outwardly from said wall, said axle comprising a shaft, a knob suitably fastened at one of the terminal ends of said shaft, a pin suitably fastened to the opposite terminal end of said shaft and distally disposed eccentrically from the center of said shaft, a bushing carried by said shaft, a washer carried by said pin, an entranceway at the centermost portion of said housing wall, said knob and said bushing being operable to fasten said shaft in said entranceway, said washer being operable to selectively engage and disengage said recess in said reel in response to rotation of said shaft and said pin to connect said reel to said axle, said reel assembly being journaled for rotation on said axle portion, means connecting said axle portion and said reel, a pawl pivotally mounted on said housing wall engageable with said ratchet portion of said reel.

2. The apparatus of claim 1 including means urging said pawl against said ratchet portion of said reel and said pawl is substantially triangular in shape.

3. The apparatus of claim 2 in which said urging means comprises a substantially S-shaped spring, said triangular shaped pawl includes a transverse groove, an upstanding pivot post being mounted to the body of said housing, spring urging means suitably fastened to said housing body, one of the end portions of said spring being carried in said groove in said pawl and extending about said pivot post, the opposite terminal end of said spring being in operative engagement with said spring urging means.

4. The apparatus of claim 3 in which said spring urging means comprises an operating pin having a knob suitably fastened to one of its terminal ends, said pin being journaled for rotation in said housing body, means fastening said pin in said housing body, a spider-like disc eccentrically carried by said pin, the terminal end of said spring opposite said pawl being in operative engagement with said disc, retaining means on said pin operable to hold said spring in engagement with said disc.

5. The apparatus of claim 3 including an upstanding stop mounted on said housing body adjacent said pawl and distally from said spring, said stop being operable to limit movement in one direction of said pawl in response to movement of said spring against said stop.

* * * * *